No. 754,576. PATENTED MAR. 15, 1904.
A. B. LAWTHER.
APPARATUS FOR TREATING OIL CAKE.
APPLICATION FILED JULY 30, 1903.
NO MODEL. 11 SHEETS—SHEET 1.
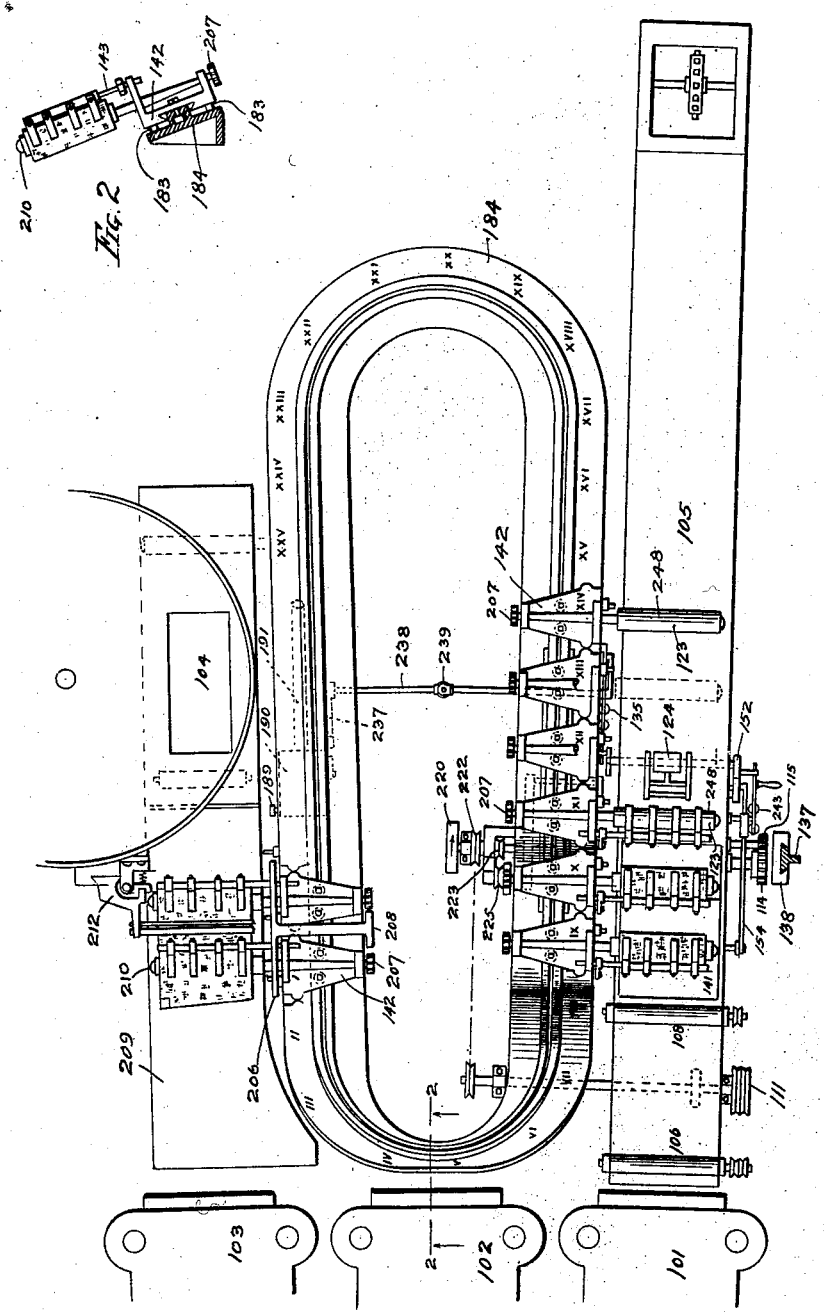
WITNESSES:
F. B. Townsend
H. W. Munday
INVENTOR.
Alfred B. Lawther.
BY
Munday, Evarts & Adcock,
his ATTORNEYS

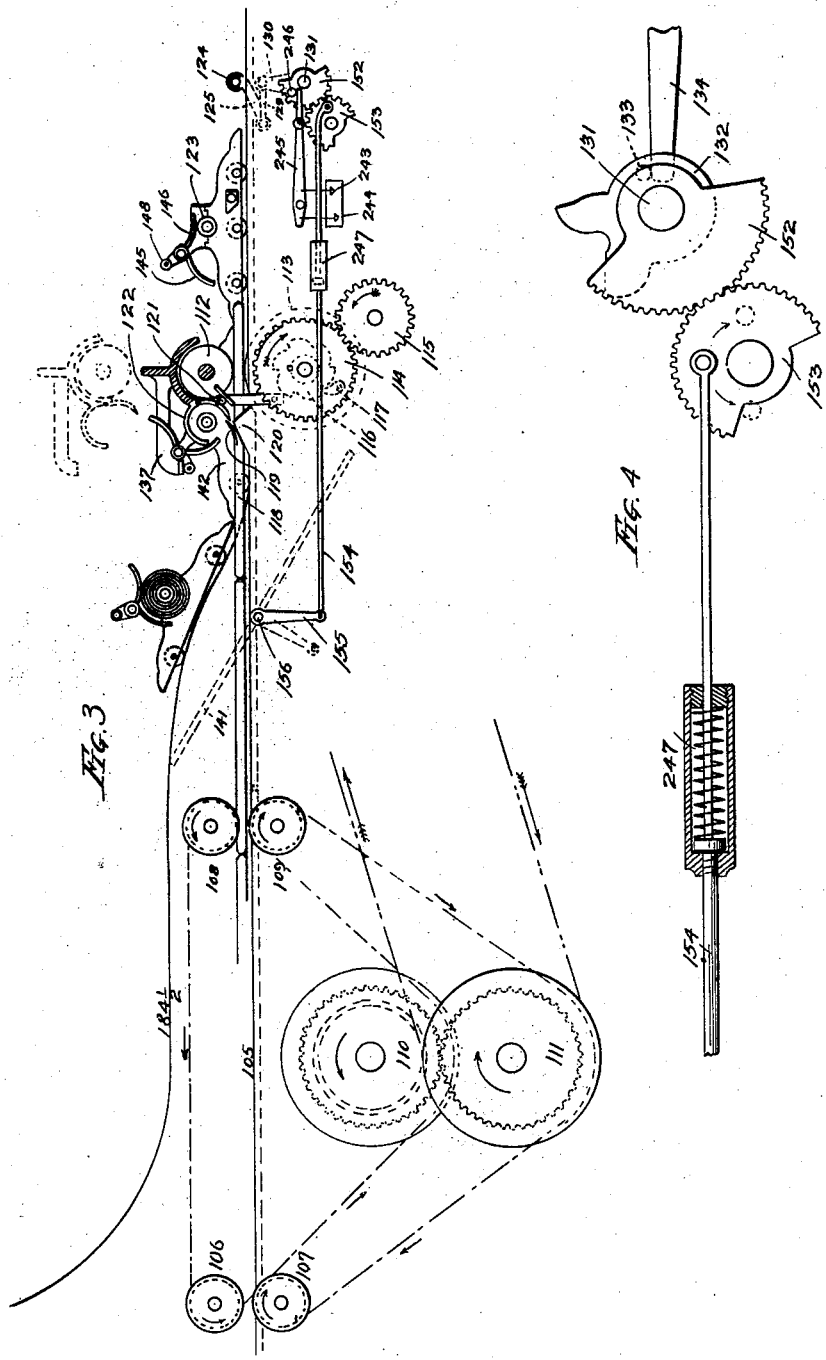

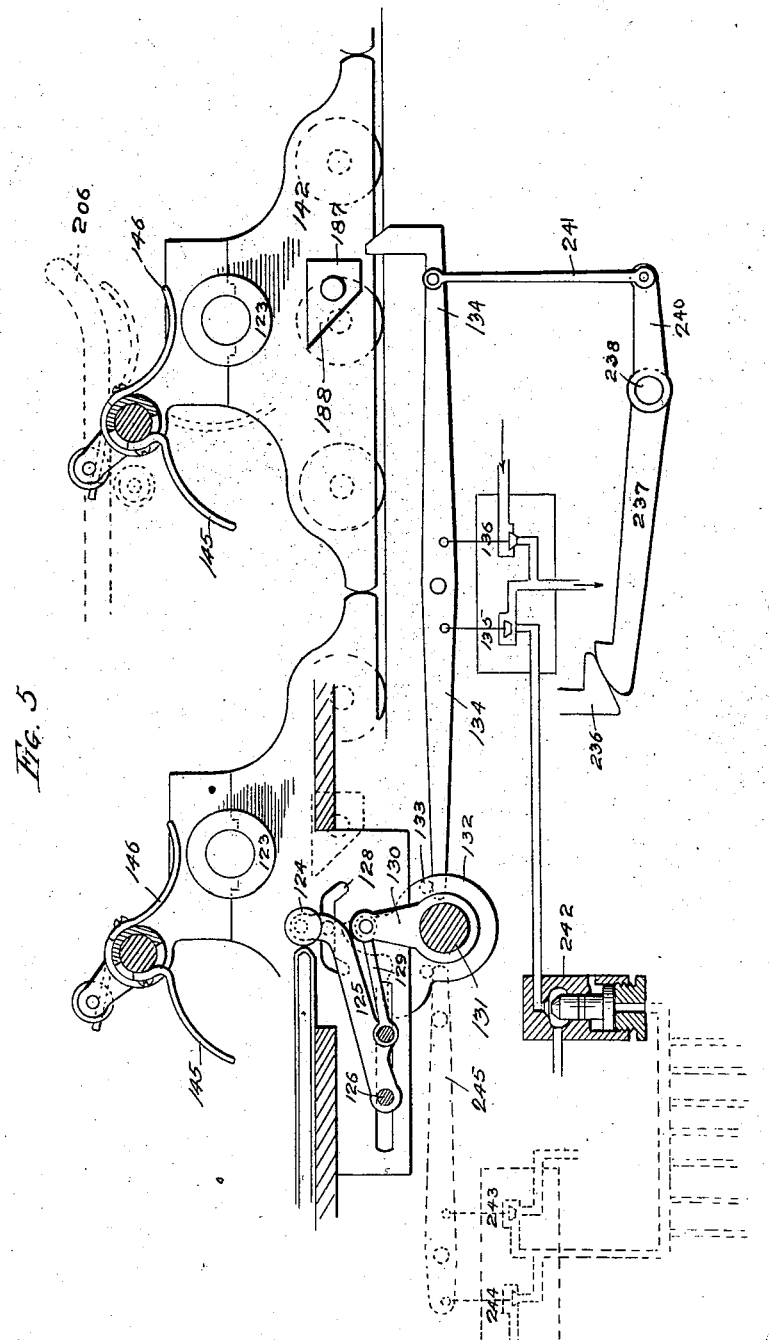

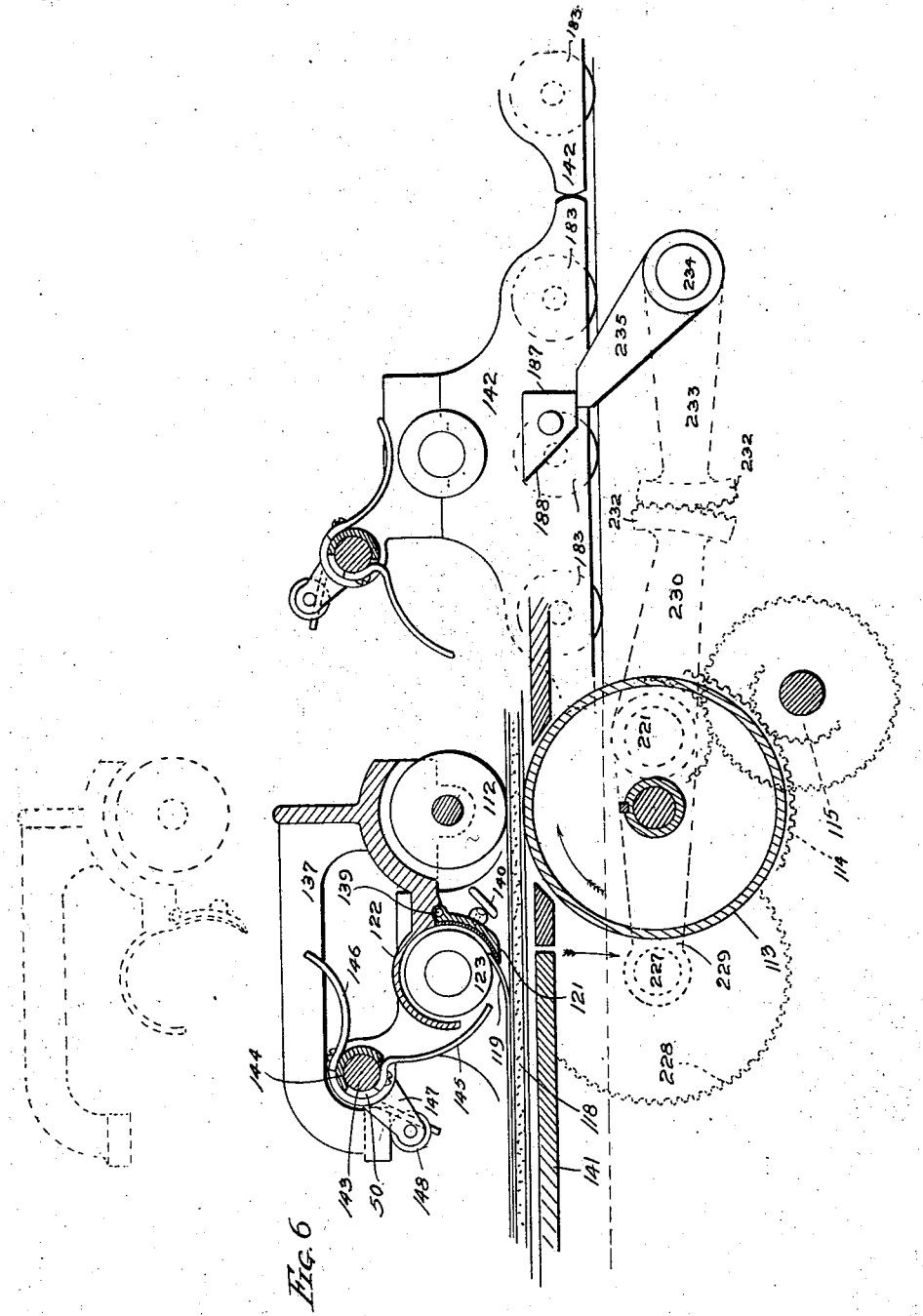

No. 754,576. PATENTED MAR. 15, 1904.
A. B. LAWTHER.
APPARATUS FOR TREATING OIL CAKE.
APPLICATION FILED JULY 30, 1903.
NO MODEL. 11 SHEETS—SHEET 5.
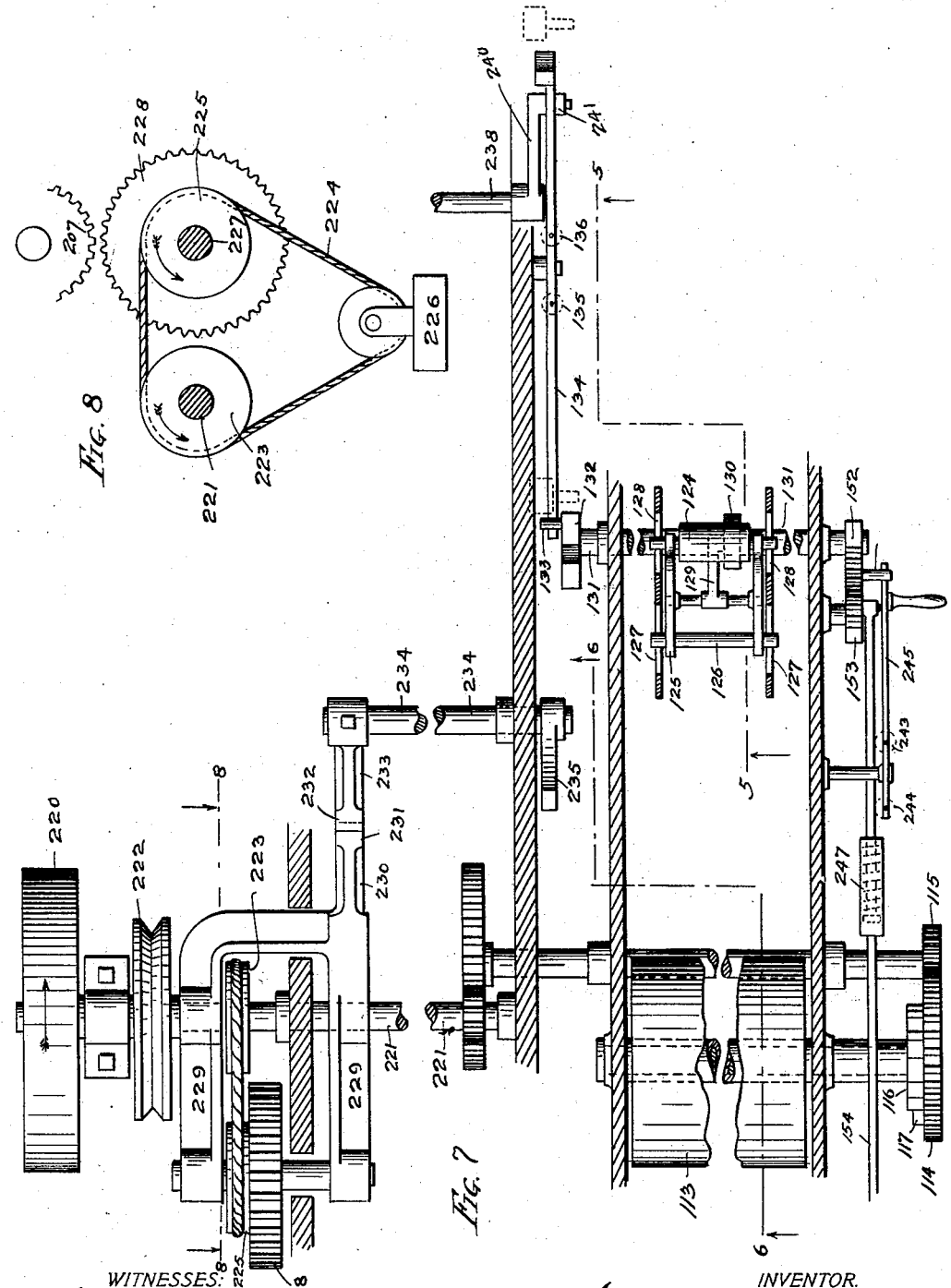
WITNESSES:
F. B. Townsend
H. W. Munday
INVENTOR.
Alfred B. Lawther
BY
Munday, Evarts & Adcock
his ATTORNEYS

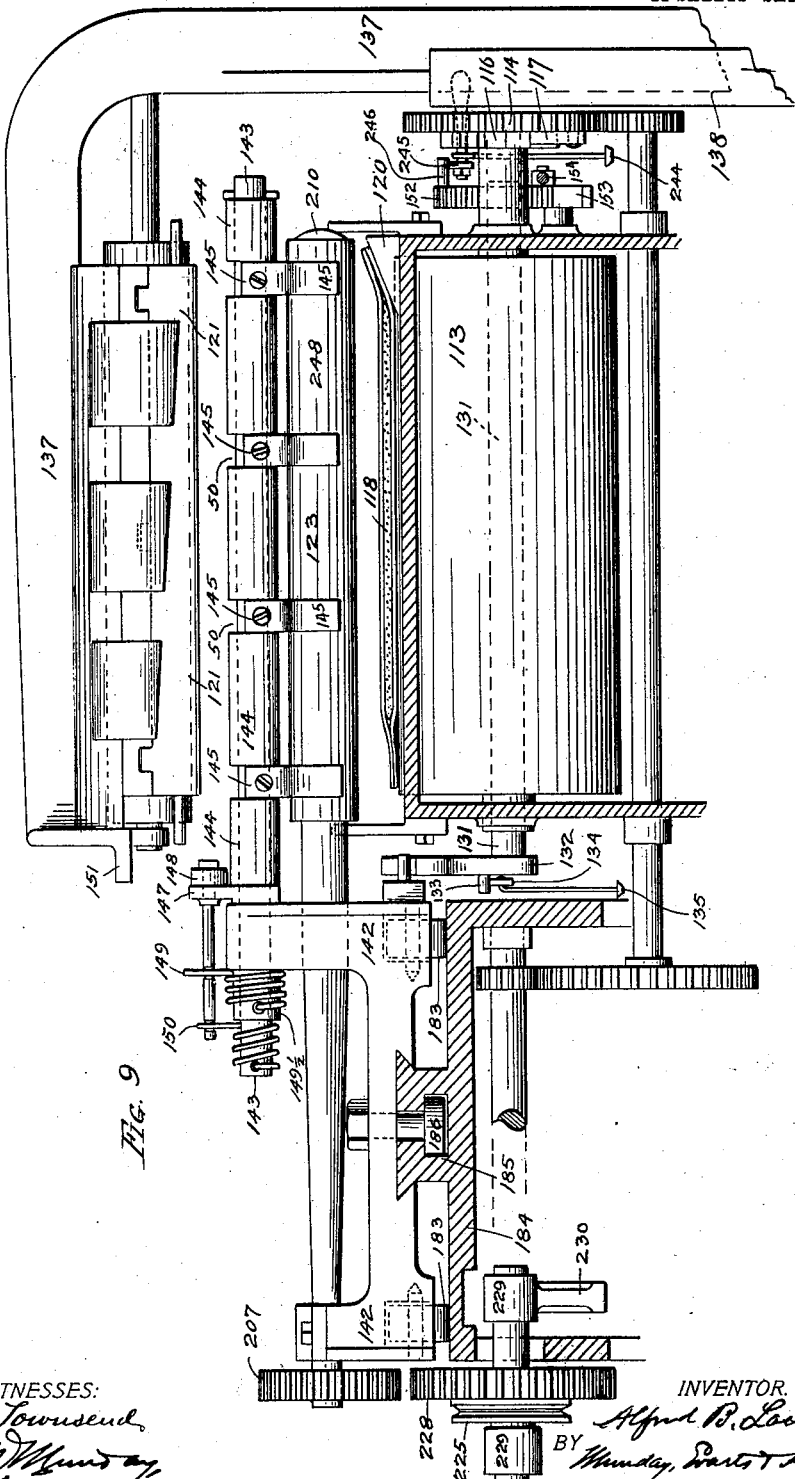

No. 754,576. PATENTED MAR. 15, 1904.
A. B. LAWTHER.
APPARATUS FOR TREATING OIL CAKE.
APPLICATION FILED JULY 30, 1903.
NO MODEL. 11 SHEETS—SHEET 7.
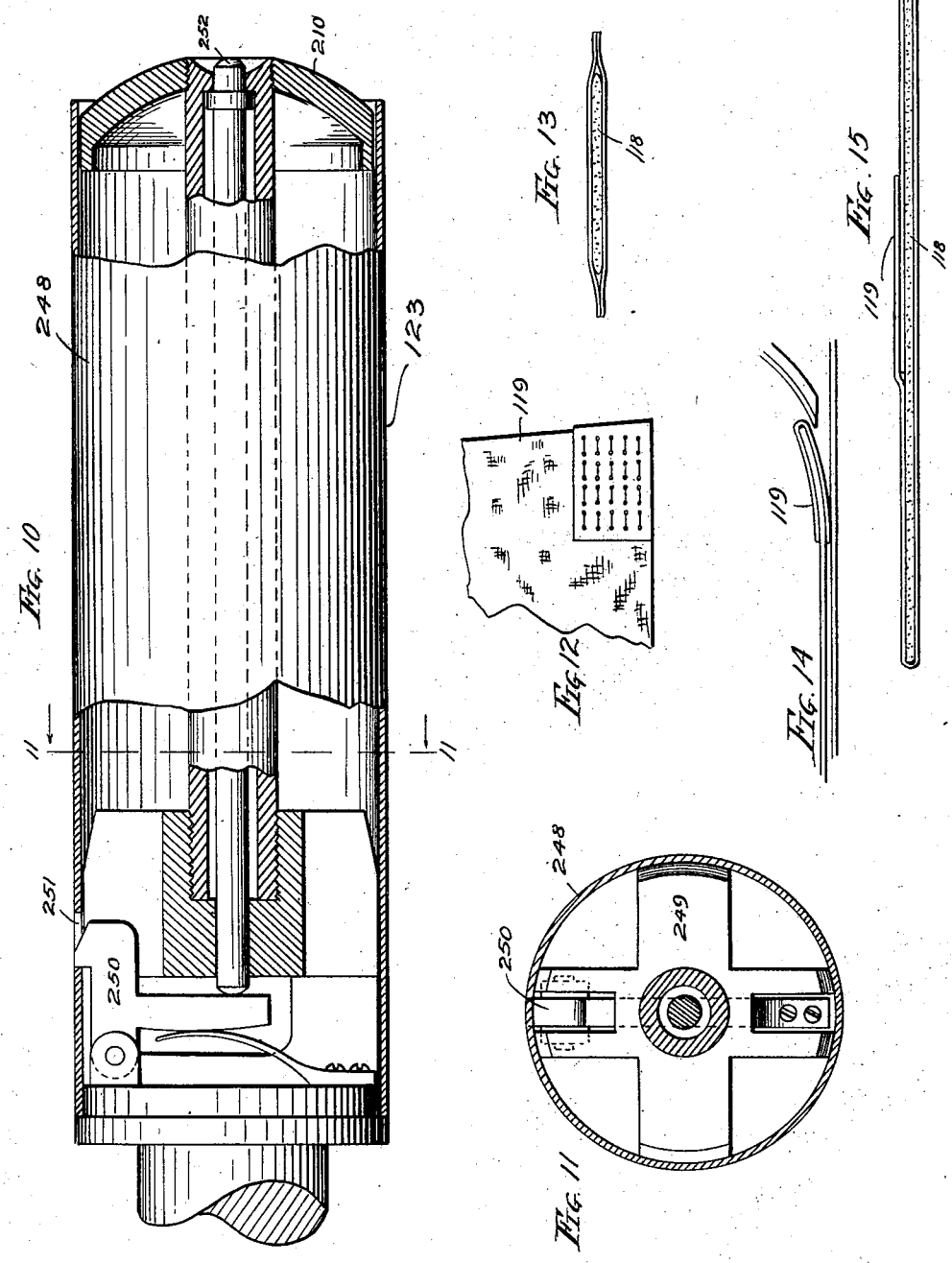

No. 754,576. PATENTED MAR. 15, 1904.
A. B. LAWTHER.
APPARATUS FOR TREATING OIL CAKE.
APPLICATION FILED JULY 30, 1903.
NO MODEL. 11 SHEETS—SHEET 8.
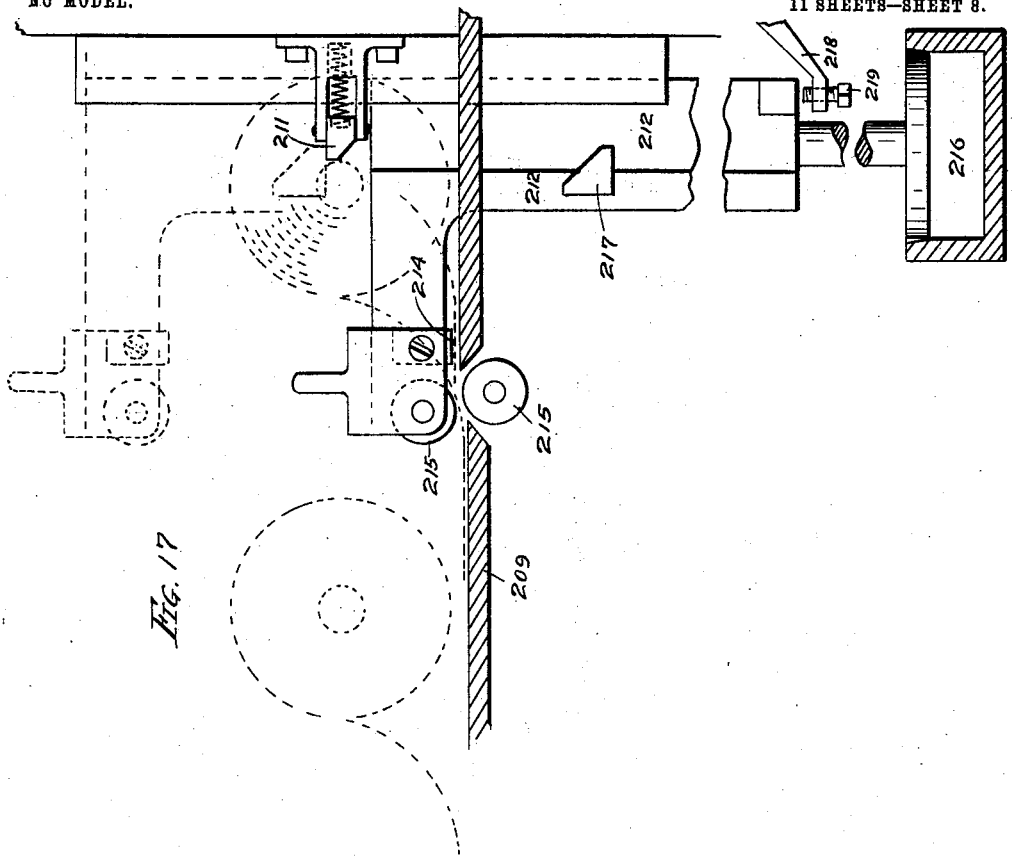
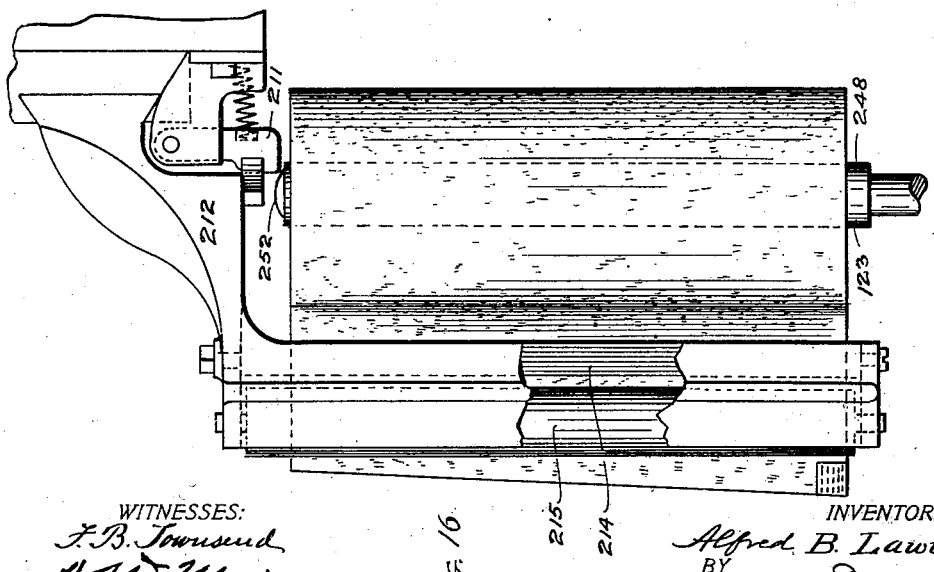
WITNESSES:
F. B. Townsend
H. W. M. Munday
INVENTOR:
Alfred B. Lawther
BY Munday, Evarts & Adcock
his ATTORNEYS

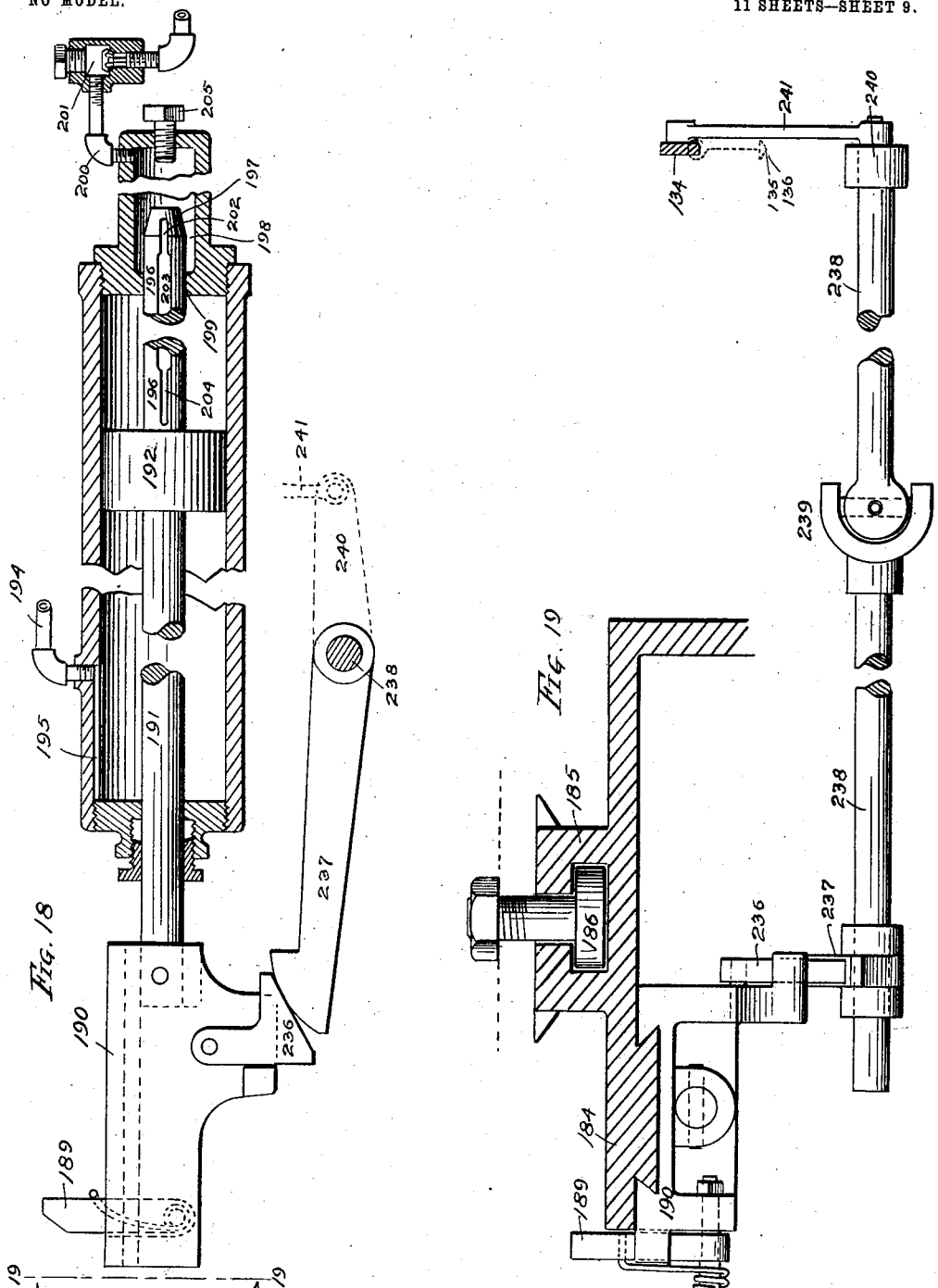

No. 754,576. PATENTED MAR. 15, 1904.
A. B. LAWTHER.
APPARATUS FOR TREATING OIL CAKE.
APPLICATION FILED JULY 30, 1903.
NO MODEL. 11 SHEETS—SHEET 10.
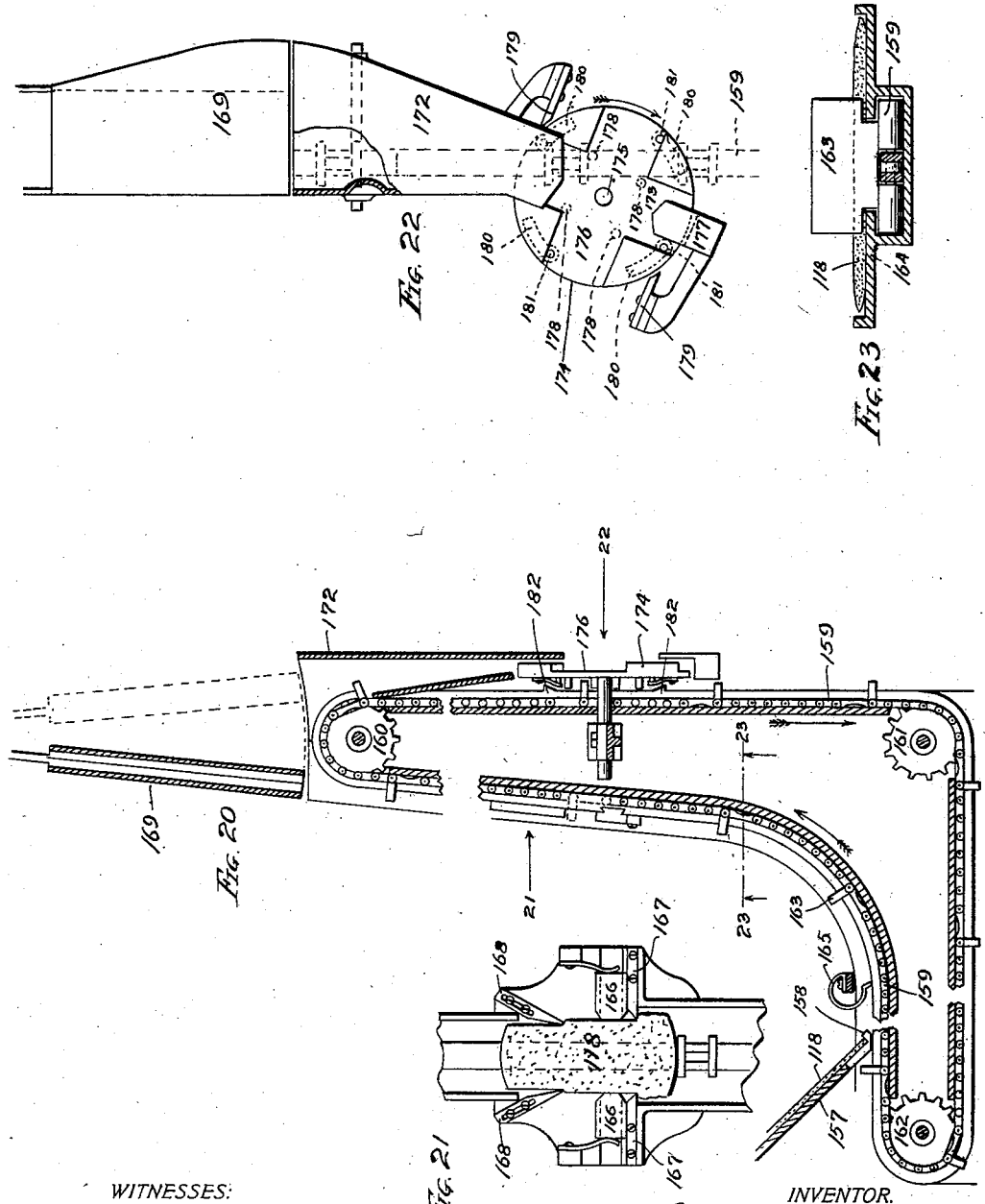
WITNESSES:
F. B. Townsend
INVENTOR.
Alfred B. Lawther
BY
Munday, Evarts & Adcock
his ATTORNEYS

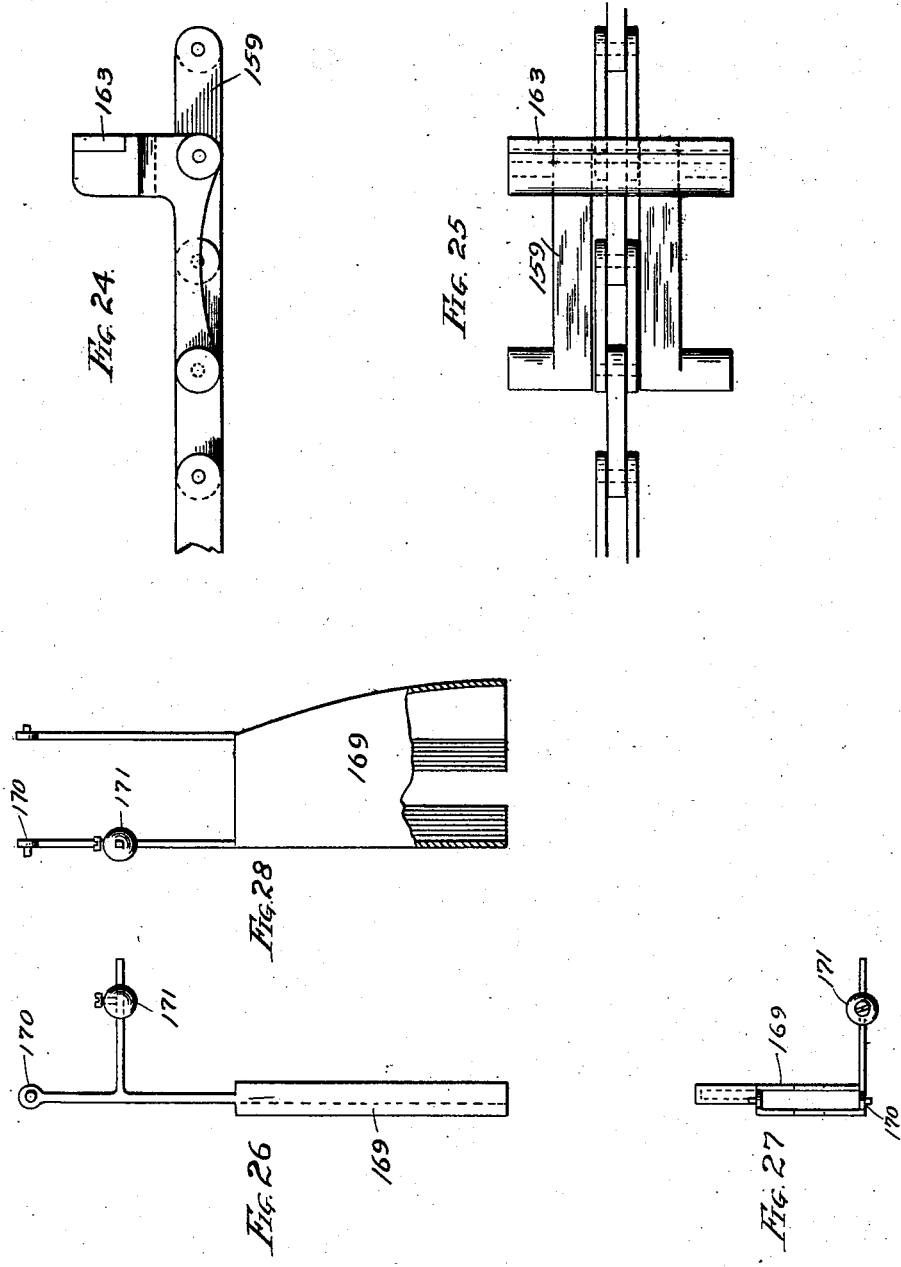

No. 754,576. Patented March 15, 1904.

UNITED STATES PATENT OFFICE.

ALFRED B. LAWTHER, OF SYRACUSE, NEW YORK, ASSIGNOR TO FREDERICK O. SWANNELL, OF CHICAGO, ILLINOIS.

APPARATUS FOR TREATING OIL-CAKE.

SPECIFICATION forming part of Letters Patent No. 754,576, dated March 15, 1904.

Application filed July 30, 1903. Serial No. 167,557. (No model.)

*To all whom it may concern:*

Be it known that I, ALFRED B. LAWTHER, a citizen of the United States, residing in Syracuse, in the county of Onondaga and State of New York, have invented a new and useful Improvement in Apparatus for Treating Oil-Cake, of which the following is a specification.

This invention relates to an apparatus to be used in conjunction with an oil-press, to which the oil-meal wrapped in the usual cloth has been supplied and in which the said meal has been reduced to the form of cake still wrapped in its cloth, and the present apparatus is constructed to receive from the press such oil-cake, to strip the cloth from the cake, to trim the cake and discharge the same, to spread the stripped cloth in the cake-forming machine in position to receive the meal for another cake for delivery to the press by the cake-forming machine, the mechanism being so constructed as to operate consecutively and automatically.

The apparatus is specially designed to be used in conjunction with the automatic oil-press fully explained in my Patent No. 720,532, in which a series of presses are mounted upon a turn-table, so that each individual press is brought in succession to the positions where it receives its cakes and discharges them.

The invention consists in the novel devices, combinations, and parts herein shown and described.

In the accompanying drawings, which form a part of this specification and consisting of eleven sheets, Figure 1 is a plan view of the apparatus. Fig. 2 is a section on the line 2 2 of Fig. 1 with one of the stripping-spindles and its carriage shown as being moved into that position. Fig. 3 is an elevation of a part of Fig. 1. Fig. 4 is a detail enlarged view of some of the parts shown in Fig. 3. Fig. 5 is another view of parts shown in Fig. 3. Fig. 6 is another detail view of parts shown in Fig. 3. Fig. 7 is a sectional plan view of a portion of Fig. 1. Fig. 8 is a vertical section on the line 8 8 of Fig. 7. Fig. 9 is a cross-section of the lower portion of Fig. 1. Fig. 10 is an elevation, partly in section, of the stripper-spindle and its shell. Fig. 11 is a section taken on line 11 11 of Fig. 10. Figs. 12, 13, 14, 15 are detail views showing, respectively, the reinforced corner of the cake-cloth, a cross-section of the cake and its cloth, a view of the upturned end of the cake-cloth about to be stripped from the cake, and a longitudinal section of the cake and its covering-cloth, showing the lap of the latter. Fig. 16 is a plan view of one of the stripper-spindles with the cloth wound thereon. Fig. 17 is a sectional view of the mechanism for holding the cloth while being unwound from the stripper-spindle and spread over the cake-forming machine to receive the fresh cake. Fig. 18 is a sectional view of the cylinder and piston for moving the spindle-carriages step by step in their operation. Fig. 19 is a detail view. Fig. 20 is a sectional view of the cake-trimming device. Fig. 21 is a face view of the apparatus shown in Fig. 20, the view being taken at the arrow 21 on Fig. 20. Fig. 22 is a view at the arrow 22 of Fig. 20. Fig. 23 is a section on the line 23 23 of Fig. 20. Figs. 24 and 25 are details of the chain shown in Figs. 20 and 23. Figs. 26, 27, and 28 are respectively a side elevation, a plan view, and a face elevation of the swinging frame at the top of the cake-trimmer shown in Fig. 20.

To render the following detail description more intelligible, it is best, perhaps, to first state what happens to the cake and its cloth in the operation of the machine without special reference to the mechanism for performing these operations.

In operation the pressed cake wrapped in its cloth is delivered from the press to the proper part of this apparatus. The condition of the cake at this time is that which usually exists in all oil-presses after pressing—that is to say, the meal is compressed into a solid mass of nearly uniform thickness in all parts excepting at the edges, where the cloth is open and will have permitted the meal to exude to some extent, leaving at each edge a marginal portion of thinner and softer texture. The ends of the cake are supported in a measure in the press by the cloth which is folded around the cake in the manner indicated in Fig. 15, the cloth being long enough to overlap itself, as shown in that figure. To render the flimsy cloth more easily capable of being picked up by the stripping mechanism, it may be advisable and in case of wear it is preferable to provide at least one corner of the overlap with a reinforcement of suitable material—as, for instance, a piece of leather or thin metal or cloth itself—stitched or fastened to both corners of said overlap, as indicated at Fig. 12. It will be found, however, that when the cloth-incased cake comes out of the press and is relieved from its pressure the overlapping end of the cloth will usually of itself tend to turn or curl up into such position that it may be seized by a stripping mechanism. In the present apparatus the cake is moved from the press horizontally endwise in a direction so that the overlap of the cloth, which is on top of the cake, is in front, and therefore can engage a pick-up plate, which stands at an incline to the horizontal table on which the cake moves. The forward movement of the cake crowds the end of the overlapping cloth into this pick-up until such end reaches a revolving shaft, the lower periphery of which moves in the direction of motion of the cake. The end of the cloth is caught by this shaft or stripping-spindle and wound upon the shaft, which operation itself forces the cake along until the end of the cake is reached, after which said winding lifts the end of the cake to the upper periphery of the revolving spindle and the cloth is stripped from the lower surface of the cake by a continuing of the winding, thus carrying the cake back over the spindle until the other end of the cake is reached, when the cake falls off the spindle upon a trap-door, which permits it to discharge from this part of the apparatus, the remainder of the cloth on the upper portion of the cake being wound up on the spindle. The discharged cake, falling through the trap-door, is received upon a chain carrier, which carries it up between knives or cutters that trim the edges of the cake, and said carrier discharges the cake to a device which trims off the ends and discharges the finished cake. The stripping-spindle containing the wound cloth is carried around to the cake-forming machine, where one end of the cloth is seized and the spindle moved to unroll the cloth and lay it in position in the cake-forming machine to receive a measured amount of the meal to form another cake upon the same cloth. Sufficient spindles are provided so that the operation may be continuous, as cake after cake is discharged and the presses refilled, the operation being both continuous and automatic. As one spindle is filled with a cloth another one takes its place.

In the drawings, (see Fig. 1,) 101 102 103 represent three of the oil-presses mounted upon a turn-table and constructed to be moved automatically by a step-by-step movement from the position occupied by, say, 101 to the position occupied by 102 and 103 successively. The press 101 in the drawing is supposed to be in position to discharge its pressed cakes. The press 102 is in an intermediate position, and the press 103 is an empty one and in position to receive its charge of fresh cakes. The cake-forming machine is indicated at 104, same figure, and is or may be constructed like the cake-forming machine in my said Letters Patent No. 720,532, and the same need not be here described, the function of it being to place a measured quantity of oil-meal upon an unfolded cake-cloth, said meal being placed on said cloth in a layer of equal and uniform density as nearly as possible, and to fold the cloth around the ends of the cake with one end of the cloth overlapping the other on the upper surface of the cake, and finally to feed the formed cake into the press. All of this operation is fully described in my previous patent, together with the mechanism for accomplishing it. Opposite the press numbered 101—the one from which the cakes are about to be discharged—stands the table 105, and at that end of said table next to the press are the four rolls 106 107 108 109, driven by the two driving-pulleys 110 and 111 (see Fig. 3) at a relatively high speed. The mechanism for discharging the cakes from the press 101 (not shown in the drawing, but fully shown and described in my former patent, No. 720,532) in discharging a cake from the press moves it into the bite of the rolls 106 107, which seize it and move it rapidly away, bringing the forward end of the cake into the bite of the second pair of equal-speeded rolls 108 109, the cake in passing being supported and sliding upon the table 105. The last pair of rolls 108 109 push the cake forward on the table 105 until the last end of the cake passes out of their grasp. Should the cake 118 be long enough so that its front end extends beneath the idle roll 112, the cake will now be in the grip of said idle roll and its underlying power-driven roll 113. This roll 113 is driven by the gearing 114 115 at a slower speed than the rolls 106 107 108 109, and consequently provision is made to accommodate the greater speed of the cake as impelled by rolls 106 107 108 109 and the stripper-spindle, which provision is as follows: Between the roll 113 and the gear 114 is a pawl and a ratchet 116 117, which permits the roll 113 to revolve in advance of its gearing under the impulse of the cake as the latter is advanced at a higher speed.

It may be noted that the draftsman has in Fig. 3 shown the cake 118 in the grip of the rolls 112 113. It will be understood that although he has not so shown it this cake should be long enough so that before its rear end leaves the grip of the high-speed rolls 110 and 109 its front end shall be within the control of the slow-speed rolls 112 and 113. At this time when fully under control of the slow-speed rolls the overlapping end 119 of the cloth (see Figs. 3, 12, 14, 15) should be near to the pick-up device, which is now to be described, as follows: In the path of the cake on the table 105, near the cake at either or both edges and so as to come under the cloth at each edge of said cake where the cloth projects laterally from the edges of the cake, are placed inclines 120. As the cake moves along these inclines lift the cloth at the edges of the cake bodily upward, the fold of cloth underneath the cake, the fold of cloth on top of the cake, and also the overlapping end of the cloth on top of all. The underlying fold of cloth beneath the cake, as soon as the inclined projection is passed, tends to draw down to its former position by reason of the weight of the cake upon it, and so, too, with regard to the fold of the cloth on the upper surface of the cake and in contact therewith, which adheres to the cake and so tends to return to its former position; but not so with regard to the overlapping end, which, on the contrary, tends by this action to separate itself and project upward in a curl. In the path of this upwardly-projecting overlapped end of the cloth is placed the plow-acting curved plate 121, which extends downward from the circular shell 122, the latter surrounding the winding-spindle 123, which is revolving with its lower periphery moving in the same direction as the cake is moving. The end of the cloth passes into the shell and into frictional contact with the surface of winding-spindle, which may be roughened, and around said spindle until the end comes in contact with the cloth yet on the cake, with the result that the cloth becomes attached to the surface of the spindle by overlying itself and by the tension produced by stripping the cloth from the advancing cake. This stripping continues until one or more turns of the cloth are wound upon the spindle, so that a perfect attachment of the cloth to the spindle is assured. When this perfect attachment has been attained, the front end of the cake will have advanced far enough on the table 105 under the influence of the stripping-spindle to encounter the roller 124, which projects up through the table and is supported on the carriage 125, said carriage being supported by rods or pins in the slots 127 128 in the stationary framework of the apparatus. The carriage 125 is connected by the connecting-rod 129 to the crank-arm 130 on the shaft 131. The end of the cake when it encounters the roll 124 pushes this carriage forward and downward, the shape of the slot 128 permitting this action. This motion of the carriage is communicated by the connecting-rod 129 through the crank 130 to the shaft 131, which rocks in response thereto. A part 132 on the shaft 131 carries a pin 133. The forward movement of the cake, causing the shaft 131 to rock as above described, brings the pin 133 in contact with a lever 134, the movement of which operates to close an exhaust-valve 135 and open a supply-valve 136. The operation of these two valves causes a supply of liquid under hydrostatic pressure to flow into a cylinder beneath its piston, and thereby to lift said piston and its piston-rod. This cylinder, its piston, and its piston-rod, to avoid confusion and unnecessary illustration, are not shown in the drawings. It may be of any ordinary construction. Its piston-rod is connected to the arm 137, which is mounted in slideway 138 on the stationary framework of the apparatus. On said arm 137 is mounted the shell 122 and the idle roll 113 and also the pick-up or curved plate 121. It will be seen that the curved plate 121 is hinged to the shell 122 by the hinge 139. The purpose of this hinging is to permit the piston to raise the parts away from the stripper-spindle 123 into the position shown in dotted lines in Fig. 6. As the shell rises the hinged curved plate swings away from the spindle, as indicated in said dotted lines, and when these parts are returned to their former position the curved plate by coming in contact with a stop 140 is swung under said spindle to partly encircle the same.

It will thus be seen that before the rear end of the cake has reached the pick-up devices and after the cloth has become firmly secured to the stripper-spindle the front end of the cake has struck a tripping device that actuates the valves to a cylinder, causing the piston of that cylinder to lift all of the parts which overlie the stripper-spindle up out of the way, leaving the stripper-spindle clear and free of obstruction in its immediate neighborhood. We now have the cake attached by its cloth to the stripper-spindle, which latter is revolving and continuing to wind up the cloth. This winding action when the end of the cake is reached will itself lift the cake by means of the cloth to the upper part of the stripper-spindle, and the further winding of the cloth upon the stripper-spindle will carry the cake over said stripper-spindle toward the press until the other end of the cake has been reached and has cleared the stripper-spindle. The further winding of the cloth will now tend to draw the cake again under the stripper-spindle; but the upper end of the cake being supported by the higher point of the trap-door 141 is depressed at the lower end, so it passes through the table instead of back on its upper surface, and this causes the cake to fall away from the cloth, where it is still attached, and discharges the cake through the table 105 to a point below said table and into the trimming mechanism presently to be described. In the meantime all of the cloth has been wound upon the stripping-spindle.

To avoid confusion, description was omitted of a part of the cloth-winding apparatus employed in conjunction with the stripper-spindle and which description will now be given. Mounted on the frame 142, which constitutes the stripper-spindle carriage, is a rock-shaft 143. (See Fig. 9.) Surrounding the shaft 143 is a tubular shaft or shell 144, and attached to the shaft 143 through slots in said shell are the curved fingers 145, and attached to the shell 144 are other curved fingers 146. Upon the shell 144 is a rocker-arm 147, carrying a roll 148. Spring 149 is attached to a fixed hub 149½, Fig. 9, and therefore lifts 147 and depresses 146. Spring 150 is attached to shaft 143 and tends to depress fingers 145 at all times, whether 137 be up or down. The movement of finger 145 in shaft 143 is gaged by the length of slots in 144. (Shown in Figs. 6 and 9.) Where space is shown at 50 in Figs. 6 and 9, 145 can straighten up to let the cake pass over the spindle. When the arm 137, that carries the idle roll 112 and the pick-up shell, is down in its lowest position, a projection 151 on said arm rests down upon the roller 148 and depresses the arm 147 into the position shown at the left-hand side of Fig. 6, which permits the spring 150 to bring the fingers 145 up under the quarter of the stripping-spindle, where they supplement the pick-up shell by carrying the contour farther underneath said spindle to better insure the delivery of the free end of the cloth into the bite of the stripping-spindle between the periphery of said spindle and the unwinding cloth. The function of the other set of fingers 146 is to act as a brake on the surface of the wound cloth at a subsequent stage of the operation when said cloth is to be unwound and to prevent the too free revolution of said spindle in the act of unwinding the cloth. If the foregoing description has been understood, it will be seen that when the pick-up shell is down in place around the spindle the fingers 145 are brought into position to aid in directing the cloth to the stripper-spindle, and the brake-fingers are then raised out of contact, and, on the other hand, when the pick-up devices are lifted from the spindle the brake-fingers are brought into action and the guide-fingers 145 removed from active position both by the action of the springs 143 and shell 144.

To recur to a description of the operation of the trap-door 141 in the table 105 on the shaft 131, which, it will be remembered, was rocked by the front end of the cake striking against the roller 124 to bring about the elevation of the arm 137, that carries the pick-up shell, &c., is the segmental gear 152, meshing with the segmental gear 153, the latter carrying the connecting-rod 154, attached to the crank-arm 155, said crank-arm being on the pivot-shaft 156 of the trap-door 141. Thus it will be seen that when the cake is in position to be carried back over the top of the stripper-spindle by the action of the winding of the cloth thereon at this time the trap-door is swung open into the position shown in dotted lines at Fig. 3—that is to say, with its rear end elevated at an angle of about forty-five degrees and in position to be struck by the cake as it is wound back over the stripper-spindle. This insures that the cake shall be certainly discharged through the trap. The cake passes over the roll 123 and beneath the arms 146, the latter being in the position indicated in Fig. 5. It will be noted that the outer extremity of the arms 146 is curved upward, which thus permits the cake to enter easily between them and said roll 123. The end of the cake will strike against the arms or fingers 145 and will raise them, if necessary, out of the way, arms 145 being spring-mounted, as also are the arms 146, and controlled by springs 149 and 150.

When the cake 118 falls through the trap-door, it alights upon the inclined way 157 (see Fig. 20) and slides down this until it is arrested by the ledge 158 at the foot of said incline. Below the ledge 158 is the moving chain-carrier 159, which for a distance greater than the length of the cake moves in a horizontal direction, then curves upward, being guided in grooves at its side, and rises at a slight angle from vertical, passing over sprocket-wheel 160 down in a vertical direction to sprocket-wheel 161, then horizontally to sprocket-wheel 162, and so back to the starting-point beneath the ledge 158, on which the cake rests. At intervals greater than a cake length apart this chain carries projecting knees 163, which pass through a slot in the lower end of the inclined way 157 and its ledge 158, so that the motion of the chain causes one of these knees to strike the lower end of the cake, and thus to move it down upon the table 164, which overlies the chain, and through a slot in which the knees 163 project. (See Fig. 23.) It may happen that when the cake is thus delivered to the action of the chain its front end will rest upon that knee 163 which has caused its delivery. If so, the movement of the knee will bring the front end of the cake in contact with the projecting spring-arm 165, and this arm will retard the motion of the cake until the knee has been slipped from under it and the cake lies flat on the table above the chain and thereafter moves in that position, urged forward by the succeeding knee 163. At each side of the way, Fig. 21, in the path of the cake is located a spring-pressed guide 166, carrying a knife 167. These knives are relatively blunt and are intended to scrape, cut, or tear away the loose or soft edges of the cake and so to guide it that the harder portion of the cake may be central to the guides 166. Above the guides 166 and one at each edge of the cake are adjustable sharp knives 168, which cutting into the harder portion of the cake operate to trim the edge to the accurate dimension desired as the cake passes up between them. (See Fig. 21.) Above the upper sprocket-wheel 160 is the swinging open-ended box or switch 169, pivoted above at 170 and provided with a counterweight 171, the weight of which tends to hold the open lower end of this box or switching-receptacle in the inclined position shown in Fig. 20, so that the cake as it is carried up enters the switch and being followed by the knee 163 said knee by contact with the lower end of the cake swings the switch over into the position indicated by the dotted lines, bringing the cake over the open mouth of the hopper-chute 172, and the cake drops immediately into this chute and is guided thereby into a cross-groove 173 in the revoluble disk 174, mounted on a pivot or shaft 175. (See Fig. 22.) This disk has two grooves crossing each other at right angles, the one, as before stated, which is marked 173, and another, 176. The further downward movement of the cake is arrested in this groove by means of a stop 177, so that the cake is thereby held in the disk. On the back of the disk 174 are four pins 178. As the chain continues to move one of its knees 163 will come into contact with one of these pins and will rotate the disk through a quarter-revolution, which will carry the two ends of the cake against the knives 179 179, which will trim the ends of the cake and bring the cake into the cross position also the other groove in the disk into position to receive the next cake. On the back of the disk are placed four springs 180, each of which carries a pin 181 to project through the disk and come into contact with the cake, and on the stationary frame of the machine is located projection 182, into contact with which the springs come on the continued movement of the disk, forcing the pins against the trimmed cake, which tips the cake out of the groove and discharges it from the machine in a finished condition.

We have now followed the cake discharged from the press, have seen it stripped of its cloth, trimmed at edges and ends, and discharged from the apparatus as a finished product, and it is now in order to follow the cloth that has been removed from this cake until it reaches the cake-forming machine and is spread out thereon to receive the meal for another cake. It will be remembered that we left the cloth wrapped around the revolving stripper-spindle, from above which the arm 137, carrying the pick-up shell, &c, has been lifted into the position shown in dotted line in Fig. 6 to be out of the way of the cake in its passage back over the top of said stripping-spindle.

In the apparatus as illustrated in the plan view of Fig. 1 it is intended that there should be twenty-five stripper-spindles, although a less number is shown. Of course it will be understood that a greater or less number may be employed, as desired, the number depending upon conditions presently to be stated. These stripper-spindles require to be moved from the position in which they receive the cloth to the position in which said cloth is to be delivered by them to the cake-forming machine 104. To facilitate this operation, each of the stripper-spindles is mounted upon a carriage consisting of the frame 142, provided with wheels 183. For these wheels to run upon an endless track 184 is provided, which is horizontal in most part, but adjacent to the presses tips up to or approximately to the vertical, and at one place adjacent to the trap-door above described has a rise or incline 184½ to lift its carriages above and out of the way of said trap-door. In the center of this track is a slotted way 185 to receive a headed bolt 186, the upper portion of which is secured to the carriage-frame 142, upon which the stripping-spindle is carried. The purpose of this headed bolt and slotted way is to afford a means for holding the carriage on the track, more especially in the turned-up parts of the track, when the carriage and the spindle are in the position indicated in Fig. 2, the position assumed when passing adjacent to the presses. To better insure a steady motion of the carriage on the track at the point when the stripping is done and for a short distance to the right hand, as shown at Figs. 1 and 2, the upper portion of the slotted way 185 is dovetailed into a dovetailed groove in the bottom of the carriage-frame, as will be seen by reference to Fig. 9.

For convenience of description the endless track has been marked off with numerals from I to XXV, there being a gap between I and XXV opposite the cake-forming machine. The number of spindles should be such that their carriages when in contact will fill the track completely full with the exception of the gap, the length of the gap representing the distance the carriage must move to unroll the cloth from the spindle when the end of the cloth is held. All of the carriages on the track being in contact with each other excepting at the gap, it is obvious that if power be applied to the rear carriage XXV to move it through a stated distance this will cause all of the carriages in front of XXV to move through the same distance. Let us suppose that the stripping-spindle upon which the cloth is wound has by some means been brought around to the station marked I and that the endless track is filled with carriages in contact from that point around to station XXV. On each carriage is a projection having a square face 187 and an inclined face 188. It is with the square vertical face of this projection that we now have to do, and it serves as the place at which a spring-hook 189 can catch the carriage to pull it across the gap between stations I and XXV to effect the unrolling of the cloth from the stripper-spindle. This hook 189 is mounted on a slide or cross-head 190, dovetailed to slide under the track 184, and this cross-head is connected to the piston-rod 191 of the piston 192 in the cylinder 193, (see Fig. 18,) the cross-head and piston-rod being indicated in dotted lines near the cake-forming machine 104 in Fig. 1. The cylinder is of somewhat peculiar structure and will now be described. The purpose is to provide a means which shall start to move the stripping-spindle carriage slowly, then continue the motion at greater speed, then at a slower speed when the moved carriage is to come in contact with the stationary line of carriages, then with an increased speed when the line of carriages is being moved, and finally at a diminishing speed until the entire stroke of the piston is completed, all of these variations of speed being accomplished by the movement of the piston itself and the parts attached thereto within the cylinder. The cylinder 193 should be made long enough so that the total movement of its piston shall be great enough to comprise the distance that is required to move the stripping-spindle carriage from station I across the gap into contact with the stationary line of carriages at station XXV and a carriage length farther to bring the moved carriage when it comes to rest at said station XXV, a carriage length being sufficient to displace the carriage whose spindle has just been filled with cloth with a carriage whose spindle is to be next filled with cloth. The cylinder is provided with an inlet and outlet port 194 on that side of the piston on which the hook 189 is located, said port entering the cylinder at some distance from the head thereof, so that when the piston is at this end of the cylinder the mouth of the port will be closed by the body of the piston, said piston being made thick enough to extend from said port-mouth almost but not quite to the cylinder-head. From the port-mouth in the inner periphery of the cylinder is cut a longitudinal channel 195, which shall preferably taper to a narrower dimension as it approaches the cylinder-head and which may extend to said cylinder-head or to the clearance-space in front of the piston when the latter is at the limit of its stroke. By this arrangement it will be seen that when the liquid under pressure is admitted to the port 194 at the beginning of the backward stroke of the piston said liquid passes into the cylinder through a narrow opening, which if the groove be tapered gradually increases in area until the piston wholly uncovers the port-mouth, after which the liquid flows into the cylinder at a rate equal to the full capacity of said port-mouth. The result in movement of the piston is a very slow start, a continued slow progress, but gradually accelerated until the port-mouth is fully uncovered, after which the piston will move at full speed for a certain distance and until its speed is checked again by the device now to be described. On the opposite side of the piston 192 is a supplemental piston-rod 196, having its end, as at 197, tapered. A chamber 198 is connected to the cylinder-head at this end, and it has an opening 199 into the cylinder itself, bored to the same diameter as the supplemental piston-rod 196. From the end of this chamber 198 opens the other port 200, which may, if desired, be provided with a grooved check-valve 201 to retard the flow of liquid at this end to an arbitrary predetermined extent, although this latter feature may not be necessary. The piston moving at its full speed approaches the taper end of its supplemental piston-rod to the opening into the chamber 198 and moves at full speed until this taper end 197 begins to enter the opening in front of it; but as soon as said taper end enters said opening the free outflow of liquid from the cylinder begins to be checked and is gradually more and more checked as the base of the cone approaches the opening until it is reduced to a slow speed, when the full diameter of the supplemental piston-rod has seated itself in the opening, at which time the only outflow that can take place is through the narrow groove 202 near the end of the supplemental piston-rod. This groove is so small that the movement of the piston is almost stopped and continues very slow until the enlargement in said groove 203 is reached, whereupon the outflow is increased to the relative extent of said enlargement and the speed of the piston proportionately increased during the whole continuance of said enlargement and until the narrow groove 204 at the other end is reached, whereupon the movement is again made very slow until the full limit of the piston-stroke is reached and the end of the supplemental piston-rod strikes upon the adjustable screw-stop 205, which brings it to a standstill in this direction. In this apparatus as the piston in its return stroke has no work to do except to locate the spring-hook 189 the speed of the reverse stroke is a matter of indifference, though as constructed the return of the piston will be more rapid and the final portion of its stroke will be checked as the piston covers the mouth of port 194.

As before stated, the apparatus was designed to be used with the apparatus described in my Patent No. 720,532, in which a cylinder and piston are employed to move the molded cake from the cake-forming machine into the press, and it chances that the timing of the movement of this cake-forming-machine cylinder and piston is or may be the same as the timing of the movement of the piston 192 in this apparatus. Hence I have found it convenient to connect the valves of the ports of these two cylinders together, so that the mechanism for operating said valves may be the same mechanism, and for this reason I have omitted in the present description all reference to such mechanism; but, if desired, the valves of the cylinder 193 may be operated by a cam or cams from the rotary shafting employed to give motion to the rotary stripping-spindle by a suitable timing mechanism arranged to operate at the same intervals as the presses and the cake-forming machine.

It will be remembered that the carriage standing at station I with its stripper-spindle wound full of cloth has its projection with the face 187 in position to be seized by the spring-hook 189 when the piston moves the hook behind said projection. Just before coming to a stop at station I the carriage has run underneath a presser-bar 206, which encounters the roller 148 on the arm 147, which operates to relieve the brake action on the stripper-spindle by lifting the brake-fingers 146 out of contact with the cloth, thus leaving the cloth free to unroll and trail. When the hook 189 begins to move the carriage, the pinion 207 on the end of the stripper-shaft comes under a short rack-bar 208, which rotates the pinion and its shaft and starts to unwind the cloth, so that it will trail on the table 209, which is at the end of the cake-forming machine 104. A slightly further movement of the carriage brings the boss 210 on the end of the stripper-spindle in contact with the spring-latch 211, that supports the vertically-sliding frame 212. This vertically-sliding frame carries what may be termed a "nipping" device and which consists of an idle roll 213 and a bar 214, both of which extend across the width of the cloth now trailing on the table 209. Beneath the table 209 and supported thereby is a roll 215, upon the upper surface of which the roll 213 rests, the cloth being between the rolls when the latch has been released, as before described, and the vertical frame has descended. The upper surface of the roll 215 is about flush with the surface of the table 209, and the lower surface of the roll 213 above it is a little below the level of the lower surface of the bar 214. The result is that so long as the cloth is between the rolls this bar does not press upon the cloth, and the latter is free to be pulled through the rolls by the forward movement of the stripping-spindle; but as soon as the end of the cloth is dragged out from between these rolls the weight of the vertical sliding frame brings the bar 214 down upon the cloth, holding it against the table firmly, so that it cannot trail any farther, so that the further movement of the carriage now unwinds the cloth by causing the spindle to revolve and lays it in position on the cake-forming machine. To guard against undue shock in the fall of the frame 213, a dash-pot 216 is provided below. After the cloth has been unrolled from the spindle it will be necessary to raise the sliding frame until its projection 217 passes the latch 211 to set the apparatus for the next carriage. This raising may be done by hand by the operator, if desired; but as it happens that the cake-forming plunger of the cake-forming machine in the apparatus of my Patent No. 720,532 raises at the proper time I prefer to attach to this plunger or some moving part connected therewith a lifting-arm 218, provided with an adjusting-screw 219, which will operate to raise said sliding frame.

Up to this point we have assumed that the stripping-spindle when in position to receive the cloth from the cake was revolving and that thereafter when this spindle was moved away from this position it did not revolve any longer until it encountered the short rack-bar 208, that caused it to revolve in the opposite direction for a short length to start the unwinding of the cloth sufficient to cause the latter to trail. I shall now describe the means for imparting rotary movement to the stripper-spindle while in position to receive and receiving the cloth.

Referring to Fig. 7, 220 is a band-wheel connected to some source of power and mounted on the shaft 221. 222 is a grooved band-wheel supplying power to the gear 111, which drives the high-speed rolls 106 107 108 109. 223 is a grooved wheel on shaft 221, connected by a rope 224 to the grooved wheel 225, the rope being endless and provided with a weighted tightener 226. On the shaft 227, which carries the grooved wheel 225, is a gear 228, which is the gear that meshes with the pinion 207 on the end of the stripper-spindle. The shaft 227 and its gear 228 are supported in a frame 229, which is pivoted on the shaft 221, an arrangement which permits the gear 228 to move toward and away from position of engagement with the stripper-spindle pinion 207. It may be noted that the weight of the tightener 226 and of the frame and parts tends to swing the gear 228 out of engagement with the said pinion 207. On an arm 230, projecting from the frame 229, is a segment-gear 231, which meshes with the segment 232 on an arm 233 from the shaft 234, the other end of which shaft is provided with an arm 235. The arm 235 (see Fig. 6) stands with its end above the track upon which the carriages ride and in such position that it is struck by the inclined face 188 of the projection on said carriage 142, which projection was heretofore referred to as also carrying the face 187, that served as a holding-place for the hook of the piston-rod for moving said carriage. The positioning of the arm 235 is such that when a carriage bearing the stripper-spindle about to be filled with cloth has reached the proper position to receive the cloth from the cake the projection on the next succeeding carriage behind it in the series will engage and rock said arm 235, and thus bring the rotating gear 228 up into engagement with pinion 207 of the positioned spindle and will hold it in such engagement so long as the carriages remain stationary; but as soon as another movement is given to the train of carriages the projection will ride over said arm 235 and the gear 228 will fall out of mesh with the spindle-pinion 207 and be ready to be again raised into engagement with the spindle-pinion of the succeeding carriage.

It will be seen from all of the foregoing that the raising of the pick-up devices out of the way of the stripper-spindle is initiated by the presence and action of a cake that is being stripped and that is dependent upon the condition that the cloth of this cake shall be properly seized by the stripper-spindle, which acts to carry said cake forward into contact with the roller 124 of the tripping device for controlling the valve of the cylinder and piston for raising the frame-arm 137, to which said pick-up devices are attached, and it will be also seen that if this operation shall fail by reason of the cloth not being properly seized by the stripper-spindle that the succeeding movements of the apparatus would cause the carriage to crash into the pick-up devices, which would there remain lowered and cause a break-up. I have therefore thought it advisable to provide a safety appliance to guard against such an accident and which I shall now proceed to describe.

On the cross-head 190 (see Figs. 18, 19) is a depending latch 236, hanging in such position that when the piston 192 operates to pull a carriage across the space or gap at the molding-machine this latch 236, with its cam-face, will come in contact with a lever-arm 237 on the cross-shaft 238. This shaft embodies a knuckle-joint 239, as it may be inconvenient for it to run in a straight line. On the opposite end of this shaft 238 is an arm 240. To the end of this arm 240 is attached a connecting-rod 241, connecting said arm to the lever 134, which, it will be remembered, is the lever for operating the valves of the hydraulic cylinder that raises and lowers the frame 137, carrying the pick-up shell, &c. When the latch 236 operates the lever 237, the said lever 134 will be moved in such manner as to open the valve 136 and close the valve 135, and the effect of this is that the hydraulic cylinder operates to raise the frame-arm 137 and lift the pick-up shell, &c., out of the way of the moving carriages. The latch 236, which initiates this movement, is so placed that the movement occurs at a period of time shortly after the front end of the cake should have reached the roll 124 in the normal operation of the machine if the cloth of said cake had been properly seized by the pick-up devices, and for this reason the safety appliances do not interfere in any manner with the normal operation of the machine. The unstripped cake is removed from the machine by hand. It will be noticed that the operation just described has left the roller 124 in the elevated position, for the cake has not struck it and there has been nothing to depress it, and when the succeeding carriage moves its cam-shaped face 188 into contact with the lever 134 this would operate to reverse the position of the valves 135 and 136, and thus cause the cylinder and piston they control to lower the frame 137, that carries the pick-up devices, &c., into the way of the carriages and produce the very smash-up which it is the object of the safety contrivances under description to prevent, and to guard against I provide a special cylinder 242, the piston of which shuts the exhaust-passages of the valves 135 and 136, so that when this cylinder 242 is operated the operation of the valves 135 and 136 for the time being produce no effect. This cylinder 242 is controlled by the valves 243 244, (shown in dotted lines at Fig. 5,) and these valves 243 244 are operated by a lever 245. This lever is moved by a pin 246 on the segmental gear 152, which, it will be remembered, is on the shaft 131. The result of these arrangements is that the apparatus will continue to move in its regular step-by-step operation and be ready to receive the next cake, notwithstanding the failure of a single cake to cause the normal movement, which normal movements are resumed in their regular order. To accommodate the extraordinary movement above described, a spring stretch device 247 is located in the trap-operating rod 154.

Although in starting the apparatus originally to work all of the stripper-spindles may be without cloth, in which case the operator at the start would spread the cloths one at a time by hand on the cake-forming machine until the press is filled with cloth-enveloped cakes, still it is desirable to provide means for supplying the stripper-spindle with cloths that have not been through the press. It will be seen that cloths may wear out or become defective and require to be removed and their places supplied while the machine is in operation. To provide for this, I make each of the stripper-spindles with a removable hollow shell, which can be slipped on and off the spindle, carrying the cloth with it, said cloth being wound upon the surface of the shell. (See Figs. 10 and 11.) This shell is shown at 248 and is supported on the angular frame 249, connected to the shaft of the stripper-spindle. A spring-latch 250 sets in a slot 251 in the shell. A sliding latch-rod 252 projects from this latch axially through the spindle and has its extremity exposed. By pressing this rod the latch can be released and the shell slipped off, carrying with it the cloth wound thereon. The cloth may then be unwound from the shell and another cloth supplied and the shell replaced at any time desired without reference to the position of the spindle in the machine, excepting the two spindles which may be employed, one in stripping a cloth and the other in spreading a cloth.

I claim—

1. The combination with an oil-press, of a conveyer for conveying the cloth-enveloped cakes from the press to a revolving stripper-spindle, and a revolving stripper-spindle surrounded by a pick-up shell for guiding the end of the cloth to the spindle, substantially as specified.

2. The combination with a revoluble stripper-spindle, of a pick-up shell for guiding the end of the cloth to the spindle, substantially as specified.

3. The combination with a revoluble stripper-spindle of a pick-up shell for guiding the end of the cloth to the spindle, and means for lifting the cloth into engagement with the pick-up shell, substantially as specified.

4. The combination of a revoluble stripper-spindle, mounted upon a movable carriage, a pick-up shell for guiding the end of the cloth to the spindle mounted on the stationary frame of the machine, and made movable up and down, so that it may be lifted away from the spindle to permit the carriage to be moved into and out of position beneath it, substantially as specified.

5. The combination of a revoluble stripper-spindle, mounted upon a movable carriage, a pick-up shell, the lower portion of which is hinged to the upper portion thereof, for guiding the end of the cloth to the spindle, mounted on the stationary frame of the machine and made movable up and down so that it may be lifted away from the spindle to permit the carriage to be moved into and out of position beneath it, substantially as specified.

6. The combination of a revoluble stripper-spindle, mounted upon a movable carriage, a pick-up shell, having a hinged lower portion, a series of supplemental guide-fingers, to supplement the action of the shell, and made movable, substantially as specified.

7. The combination with a revoluble stripper-spindle, of a table upon which the cloth-enveloped cake is moved to the spindle, a pick-up shell for guiding the end of the cloth to the spindle, a trap-door in the table and a tripping device in the path of the cake on the table for operating the trap-door, substantially as specified.

8. The combination with a revoluble stripper-spindle, of a table upon which the cloth-enveloped cake is moved to the spindle, a pick-up shell for guiding the end of the cloth to the spindle, a trap-door in the table, a tripping device in the path of the cake on the table for operating the trap-door, and a slide or chute beneath the trap-door for delivering the cake to the trimming-machine, substantially as specified.

9. The combination with a revoluble stripper-spindle, of a table upon which the cloth-enveloped cake is moved to the spindle, a pick-up shell for guiding the end of the cloth to the spindle, a trap-door in the table, a tripping device in the path of the cake on the table for operating the trap-door, a slide or chute beneath the trap-door for delivering the cake to the trimming-machine, and a trimming-machine consisting of a traveling conveyer which carries the cake between blunt knives and sharp knives for trimming the edges of the cake, and into a revolving disk for revolving the end of the cake against knives for trimming the ends of the cake, substantially as specified.

10. The combination with the cake-trimming conveyer for moving the cake, of a pair of blunt knives and a pair of sharp knives for trimming the edges of the cake, substantially as specified.

11. The combination with the cake-trimming conveyer for moving the cake endwise, of a rotating disk for receiving the cake and revolving its edges against trimming-knives, and said trimming-knives, substantially as specified.

12. The combination with the cake-trimming conveyer for moving the cake endwise, of stationary knives for trimming the edges of the cake as the latter moves between them, a rotating disk for receiving the cake and revolving its ends against trimming-knives, and said end-trimming knives, substantially as specified.

13. The combination with the cake-trimming conveyer for moving the cake endwise in an upward direction, of stationary knives for trimming the edges of the cake as the latter moves up between them, a gravity switch-box at the upper end of the conveyer, a hopper-chute to receive the cake as it descends, and for guiding it to the end trimmer, the end trimmer consisting of a revoluble disk for receiving the cake, and revolving its ends against trimming-knives, and said end-trimming knives, substantially as specified.

14. In an apparatus for stripping cloth from oil-cakes the combination of an endless track, a series of carriages mounted on said track and each provided with a stripping-spindle, a pick-up device for engaging the cloth to the spindle, means for moving the carriages one after another to the position where the cloth-enveloped cake is presented to the action of the stripper-spindle, and thence to the point where the cloth is to be unwound from the spindle, substantially as specified.

15. In an apparatus for stripping cloth from oil-cakes the combination of an endless track, a series of carriages mounted on said track and each provided with a stripping-spindle, a pick-up device for engaging the cloth to the spindle, means for moving the carriages one after another to the position where the cloth-enveloped cake is presented to the action of the stripper-spindle, and thence to the point where the cloth is to be unwound from the spindle, and means for unwinding the cloth from the spindle by the further movement of the carriage which contains the spindle to be unwound, substantially as specified.

16. The means for unwinding the cloth from the spindle mounted upon a carriage by the movement of said carriage, and which consists of a nipping device for holding the end of the cloth while the carriage is being moved, to lay the cloth over the cake-forming machine in position to receive a charge of meal, substantially as specified.

17. The combination with the movable stripper-spindle-bearing carriage, of a nipping device consisting of the table on which the end of the cloth wound on the spindle will trail, a roller on the table, and a movable frame above the trailing cloth carrying a second roller and a nipper-bar, substantially as specified.

18. The combination with the endless track and the stripper-spindle-bearing carriages mounted thereon, of the hydraulic cylinder for moving the carriages around the track step by step, said cylinder containing a thick piston, an inlet-port at one side of the piston opening into the cylinder at some distance from its head, and into a groove in the inner surface of the cylinder, whereby the piston is caused to start slowly and thereafter to move rapidly, substantially as specified.

19. The combination with the endless track and the stripper-spindle-bearing carriages mounted thereon, of the hydraulic cylinder for moving the carriages around the track step by step, said cylinder containing a supplemental piston-rod with a conical end, and having a chamber at that end of the cylinder provided with an opening into which the conical end of the supplemental rod passes in the movement of the piston, and which chamber contains the exhaust-port; whereby as the conical-ended supplemental piston-rod enters the opening into said chamber, the exhaust-flow is lessened, and the movement of the piston slowed down, substantially as specified.

20. The combination with the endless track and the stripper-spindle-bearing carriages mounted thereon, of the hydraulic cylinder for moving the carriages around the track step by step, said cylinder having at one end a supplemental chamber containing the exhaust-port, and a supplemental piston-rod to enter the opening into said chamber, the sides of said piston-rod being constructed to vary the dimension of the passage-way for controlling the outflow of liquid from the cylinder to the exhaust-port; whereby the speed of the piston may be varied during its movement, substantially as specified.

ALFRED B. LAWTHER.

Witnesses:
GEO. McGOWAN,
ELIZABETH E. SALEM.